United States Patent
Nordlund et al.

(10) Patent No.: US 9,918,140 B2
(45) Date of Patent: Mar. 13, 2018

(54) APPARATUS AND METHOD FOR IDENTIFYING EVENTS

(71) Applicant: TELEFONAKTIEBOLAGET L M ERICSSON (PUBL), Stockholm (SE)

(72) Inventors: Erik Nordlund, Hägersten (SE); Fredrik Persson, Älvsjö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/765,731

(22) PCT Filed: Feb. 5, 2013

(86) PCT No.: PCT/EP2013/052250
§ 371 (c)(1),
(2) Date: Aug. 4, 2015

(87) PCT Pub. No.: WO2014/121818
PCT Pub. Date: Aug. 14, 2014

(65) Prior Publication Data
US 2015/0365734 A1    Dec. 17, 2015

(51) Int. Cl.
*H04N 7/10*     (2006.01)
*H04N 21/658*   (2011.01)
(Continued)

(52) U.S. Cl.
CPC ........ *H04N 21/6581* (2013.01); *H04H 60/73* (2013.01); *H04N 21/2362* (2013.01);
(Continued)

(58) Field of Classification Search
CPC .... H04N 21/435; H04N 21/84; H04N 21/235; H04N 21/482; H04N 5/44543
(Continued)

(56) References Cited

U.S. PATENT DOCUMENTS 7,539,134 B1 *  5/2009  Bowes ............... H04L 1/0072
                                                  370/230
7,793,329 B2 *  9/2010  Joshi ................. H04L 12/1877
                                                  375/240

(Continued)

OTHER PUBLICATIONS

International Search Report dated Sep. 27, 2013, in International Application No. PCT/EP2013/052250, 3 pages.
(Continued)

*Primary Examiner* — Annan Shang
(74) *Attorney, Agent, or Firm* — Rothwell, Figg, Ernst & Manbeck, P.C.

(57) ABSTRACT

A method in a network entity associates a unique identifier with an event, for example a television program. The method comprises the steps of receiving an original time reference allocated to the event, for example an original start time for the event, and generating a first identifier (event_ID) to identify the event, wherein the first identifier is based on a set of first identifiers (event_IDs) that have a predetermined repetition period. The method further comprises the step of generating a second identifier (program_ID) to identify the event, wherein the second identifier is unique over time and based on a function of the first identifier and the original time reference allocated to the event. Various embodiments describe how changes to the original time reference can be made, yet still allow the unique event identifier to be determined.

15 Claims, 11 Drawing Sheets

(51) Int. Cl.
*H04H 60/73* (2008.01)
*H04N 21/2362* (2011.01)
*H04N 21/262* (2011.01)
*H04N 21/434* (2011.01)
*H04N 21/61* (2011.01)
*H04N 21/643* (2011.01)

(52) U.S. Cl.
CPC ... *H04N 21/26283* (2013.01); *H04N 21/4345* (2013.01); *H04N 21/6112* (2013.01); *H04N 21/6125* (2013.01); *H04N 21/64322* (2013.01)

(58) Field of Classification Search
USPC .............................. 725/54, 60, 61, 93, 116
See application file for complete search history.

(56) References Cited

U.S. PATENT DOCUMENTS

| | | | | |
|---|---|---|---|---|
| 7,826,498 | B2* | 11/2010 | Choi | H04N 21/235 370/535 |
| 8,005,707 | B1* | 8/2011 | Jackson | G06Q 10/10 702/179 |
| 8,019,702 | B1* | 9/2011 | Gargi | G06K 9/00523 706/12 |
| 2002/0059636 | A1 | 5/2002 | Takeuchi | |
| 2002/0184339 | A1* | 12/2002 | Mackintosh | G06Q 30/02 709/218 |
| 2003/0093790 | A1* | 5/2003 | Logan | G06F 17/30265 725/38 |
| 2003/0121046 | A1* | 6/2003 | Roy | G06K 9/00536 725/90 |
| 2006/0212902 | A1* | 9/2006 | Seo | H04N 5/4401 725/39 |
| 2007/0250890 | A1* | 10/2007 | Joshi | H04L 12/1877 725/120 |
| 2008/0010658 | A1* | 1/2008 | Abbott | H04N 7/17318 725/87 |
| 2008/0244640 | A1* | 10/2008 | Belleguie | H04N 7/165 725/35 |
| 2010/0088734 | A1* | 4/2010 | Dewa | H04N 7/17318 725/93 |
| 2011/0302025 | A1* | 12/2011 | Hsiao | G06Q 30/02 705/14.42 |

OTHER PUBLICATIONS

ETSI "Digital Video Broadcasting (DVB); Specification for Service Information (SI) in DVB systems" ETSI EN 300 468 V1.11.1, 2010, 137 pages.

* cited by examiner

| Dec 2011 | Jan 2012 | Feb 2012 | Mar 2012 | Apr 2012 | May 2012 | Jun 2012 |
|---|---|---|---|---|---|---|
|  |  |  |  |  |  |  |

Figure 3a

| Dec 2011 | Jan 2012 | Feb 2012 | Mar 2012 | Apr 2012 | May 2012 | Jun 2012 |
|---|---|---|---|---|---|---|
| 503 | 504 | 505 | 506 | 507 | 503 | 509 |

Figure 3b

| Dec 2011 | Jan 2012 | Feb 2012 | Mar 2012 | Apr 2012 | May 2012 | Jun 2012 |
|---|---|---|---|---|---|---|
| 503 | 504 | 505 | 506 | 507 | 503 | 509 |
| 2 | 0 | 1 | 2 | 0 | 1 | 2 |

Figure 3c

| Dec 2011 | Jan 2012 | Feb 2012 | Mar 2012 | Apr 2012 | May 2012 | Jun 2012 |
|---|---|---|---|---|---|---|
| 503 | 504 | ● 505 | 506 | 507 | 503 | 509 |
| 2 | 0 | 1 | 2 | 0 | 1 | 2 |

Figure 3d

| Dec 2011 | Jan 2012 | Feb 2012 | Mar 2012 | Apr 2012 | May 2012 | Jun 2012 |
|---|---|---|---|---|---|---|
| 503 | 504 | (22) 505 | 506 | 507 | 503 | 509 |
| 2 | 0 | 1 | 2 | 0 | 1 | 2 |

Figure 3e

| Dec 2011 | Jan 2012 | Feb 2012 | Mar 2012 | Apr 2012 | May 2012 | Jun 2012 |
|---|---|---|---|---|---|---|
| 503 | 504 | (22) 505 (25) | (14) 506 | 507 | 503 | 509 |
| 2 | 0 | 1 | 2 | 0 | 1 | 2 |

Figure 3f

| Dec 2011 | Jan 2012 | Feb 2012 | Mar 2012 | Apr 2012 | May 2012 | Jun 2012 |
|---|---|---|---|---|---|---|
| 503 | 504 22 | 505 | 506 | 507 | 508 | 505 |

| Dec 2011 | Jan 2012 | Feb 2012 | Mar 2012 | Apr 2012 | May 2012 | Jun 2012 |
|---|---|---|---|---|---|---|
| 503 | 504 | 505 | 506 14 | 507 | 508 | 505 |
| 2 | 0 | 1 | 2 | 0 | 1 | 2 |

| Dec 2011 | Jan 2012 | Feb 2012 | Mar 2012 | Apr 2012 | May 2012 | Jun 2012 |
|---|---|---|---|---|---|---|
| 503 | 504 22 | 505 | 506 | 507 | 508 | 505 |
| 2 | 0 | 1 | 2 | 0 | 1 | 2 |

| Dec 2011 | Jan 2012 | Feb 2012 | Mar 2012 | Apr 2012 | May 2012 | Jun 2012 |
|---|---|---|---|---|---|---|
| 503 | 504 | 505 | 25 506 | 507 | 508 | 505 |
| 2 | 0 | 1 | 2 | 0 | 1 | 2 |

```
O (Original Block Class) = event_id mod3
C (Current Block Class)  = BlockID(start_time) mod3
IF (O - C) mod3 ≡ 0
       → Program ID = <event_id>_<Current Block ID>
IF (O - C) mod3 ≡ 1
       → Program ID = <event_id>_(<Current Block ID>+1)
IF (O - C) mod3 ≡ 2
       → Program ID = <event_id>_(<Current Block ID>-1)
```

Figure 6

| Event ID | Start Date |
|---|---|
| 900 | 2012-10-30 12:00 |
| 903 | 2012-10-30 13:00 |
| 906 | 2012-10-30 14:00 |
| 310 | 2012-10-30 16:00 |
| 909 | 2012-10-30 18:00 |

Figure 11b

| Event ID | Start Date |
|---|---|
| 301 | 2012-11-01 12:00 |
| 304 | 2012-11-01 12:15 |
| 307 | 2012-11-01 13:30 |
| 343 | 2012-11-01 14:00 |
| 313 | 2012-11-01 16:00 |

Figure 11a

| Event ID | Start Date | X | Xmod | Emod | Adjusted X | Program ID |
|---|---|---|---|---|---|---|
| 900 | 2012-10-30 12:00 | 513 | 0 | 0 | 513 | 513_900 |
| 903 | 2012-10-30 13:00 | 513 | 0 | 0 | 513 | 513_903 |
| 906 | 2012-10-30 14:00 | 513 | 0 | 0 | 513 | 513_906 |
| 310 | 2012-10-30 16:00 | 513 | 0 | 1 | 514 | 514_310 |
| 909 | 2012-10-30 18:00 | 513 | 0 | 0 | 513 | 513_909 |

Figure 12

| Xmod | Emod | Result |
|---|---|---|
| 0 | 0 | No change of x |
| 0 | 1 | x=x+1 |
| 0 | 2 | x=x-1 |
| 1 | 0 | x=x-1 |
| 1 | 1 | No change of x |
| 1 | 2 | x=x+1 |
| 2 | 0 | x=x+1 |
| 2 | 1 | x=x-1 |
| 2 | 2 | No change of x |

Figure 13

APPARATUS AND METHOD FOR IDENTIFYING EVENTS

CROSS REFERENCE TO RELATED APPLICATION(S)

This application is a 35 U.S.C. § 371 National Phase Entry Application from PCT/EP2013/052250, filed Feb. 5, 2013, designating the United States, the disclosure of which is incorporated herein in its entirety by reference.

TECHNICAL FIELD

The present invention relates to an apparatus and method for identifying events, and in particular to an apparatus and method for enabling an identifier that is unique over time to be associated with the event, an event being, for example, a television program.

BACKGROUND

In television services Electronic Program Guide (EPG) is a term used to represent program meta-data for broadcasted programs, and is provided as an interactive service to end users.

FIG. 1 shows an example of how EPG data is distributed amongst the typical functions of a "hybrid" TV infrastructure that facilitates both a Digital Video Broadcasting standard 101 (DVB being the standard for television data distribution over satellite, cable, terrestrial or IP networks) and an Internet Protocol (IP) standard 103. Traditional TV services such as Linear TV, Local PVR (recordings) and so forth make use of the existing DVB standard received over Satellite/Cable/Terrestrial/IP networks, and extra add-on features are given over another network (e.g. IP), for example Video On Demand, Network PVR and Catchup TV.

Program data such as EPG data plays an important role for features that are enabled over such hybrid systems. EPG data is ingested (created, updated and deleted) in the network side, for example at a server system 105 using an EPG ingest unit 107. The data is typically stored in the system server 105 within a program storage unit 109 that serves network applications 111, such as network PVR and catchup TV. The EPG data is also distributed over satellite, cable, terrestrial or IP networks as a DVB Event Information Table (DVB EIT), and is stored locally on a client system (or client device, such as a set-top box) 113.

The Event Information Table forms part of a DVB Service Information standard (DVB-SI) that delivers meta-data for scheduled TV programs. The EPG data received at the client system 113, for example via a receiving unit 115 in the client system, is typically stored in an event storage unit 117 that serves local applications 119 with the corresponding EPG data.

The event storage unit 117 contains the DVB EIT representation of EPG meta-data for programs, known as "Events". Events have a limited lifetime since the event identifiers used to identify a particular event (known as event_IDs) are reused on a periodic basis, for example every 3 months or so. This is known as an event identifier repetition period. Event identifiers are repeated in this way since only a limited number of bits (16 bits) are available in the DVB standard for representing event_IDs. After the event Identifier repetition period has elapsed, a local application cannot make use of the event identifier as a reference.

In the DVB standard an event in the EIT also contains a Program Start Time to identify when the particular program is due to start. However, such Program Start Times cannot be used as unique identifiers for individual programs since the start time of a particular program can change, for example when a previous program is overrunning unexpectedly, or when there is a change to the programming schedule. Therefore the event identifier is used as a reference for the individual programs. The EIT information is updated repeatedly, where any old information for an event is overwritten with updated information.

Sometimes there are dependencies or interactions between client systems 113 and server systems 105. In these cases they must share the same EPG program identifiers. Many scenarios during typical use require the program identifiers to be unique over time. For example "Recommendation" and "Advertisement" applications need to refer to programs that users have watched in the past to provide effective advertisements, promotions and recommendations. Also, applications for recorded content such as Network PVR and TV Anytime services may require to store program meta-data for very long times. However, since none of the identifiers described above are unique over time, this can lead to disadvantageous situations where different parts of a system can inadvertently reference incorrect events or programs.

SUMMARY

It is an aim of the present invention to provide a method and apparatus which help obviate or reduce at least one or more of the of the disadvantages mentioned above.

According to a first aspect of the invention there is provided a method in a network entity for associating a unique identifier with an event. The method comprises the steps of receiving an original time reference allocated to the event, and generating a first identifier to identify the event, wherein the first identifier is based on a set of first identifiers that have a predetermined repetition period. A second identifier is generated to identify the event, wherein the second identifier is unique over time and based on a function of the first identifier and the original time reference allocated to the event.

According to another aspect of the invention there is provided a method in a client entity for determining a second identifier associated with an event, wherein the second identifier is unique over time. The method comprises the steps of receiving a first identifier associated with the event, and determining a current time reference associated with the event. The second identifier is determined based on a function of the first identifier and the current time reference.

According to another aspect of the invention there is provided a network entity adapted to associate an identifier that is unique over time with an event. The network entity comprises a receiving unit for receiving an original time reference allocated to the event, and a processing unit adapted to generate a first identifier to identify the event, the first identifier being based on a set of first identifiers that have a predetermined repetition period. The processing unit is further adapted to generate a second identifier to identify the event, wherein the second identifier is unique over time and based on a function of the first identifier and the original time reference allocated to the event.

According to another aspect of the invention there is provided a client entity adapted to determine a second identifier associated with an event, wherein the second identifier is unique over time. The client entity comprises a receiving unit adapted to receive a first identifier associated with the event. The client entity comprises a processing unit adapted to determine a current time reference associated with the event, the processing unit being further adapted to determine the second identifier based on a function of the first identifier and the current time reference.

According to another aspect of the invention there is provided a method of conveying implicit information via an event identifier used in a digital video broadcast protocol. The method comprises the steps of partitioning a set of event identifier values into a plurality of sub-sets, and using each sub-set to represent a portion of information which is to be conveyed implicitly with an event identifier value.

BRIEF DESCRIPTION OF THE DRAWINGS

For a better understanding of the present invention, and to show more clearly how it may be carried into effect, reference will now be made, by way of example only, to the following drawings in which:

FIGS. 3a to 3f illustrate examples of how a time unique identifier can be provided;

FIG. 6 shows an example of a pseudo code according to an embodiment of the invention;

FIGS. 11a, 11b, 12 and 13 illustrate how a time unique identifier is determined according to an embodiment of the invention;

DETAILED DESCRIPTION

Figure 1:
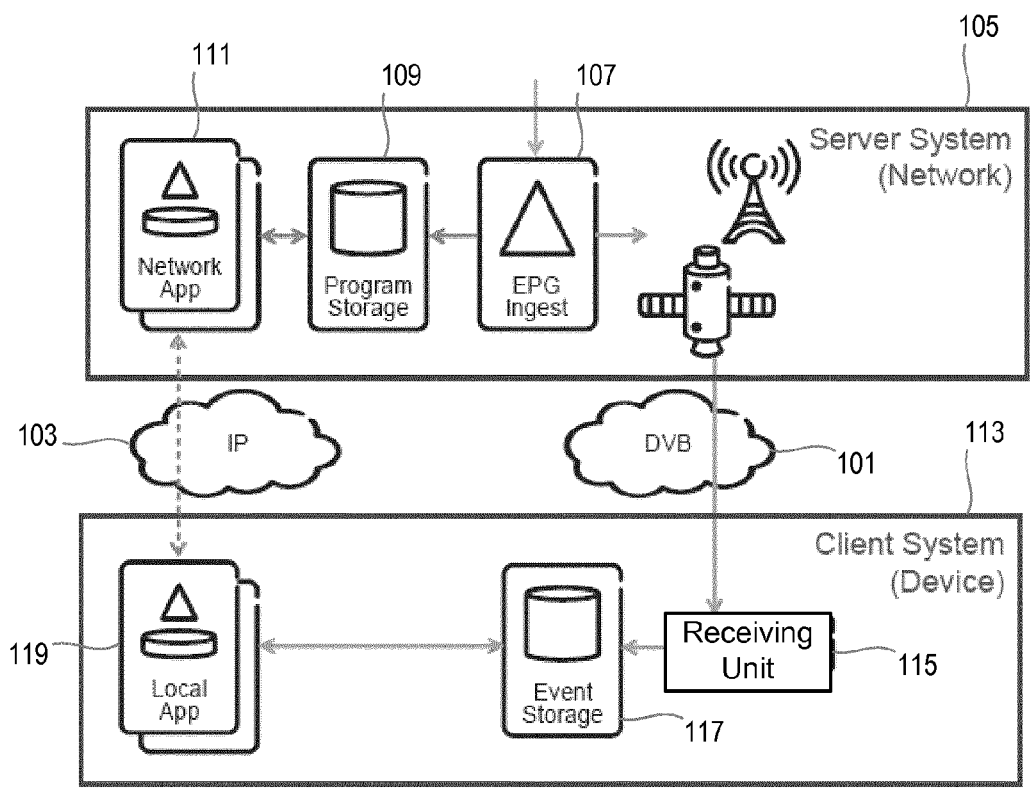
FIG. 1 shows an example of a hybrid TV infrastructure.

From the background section it can be appreciated that in the hybrid solution shown in FIG. 1 the event identifiers used in digital video broadcasting (DVB), known as event_IDs, are repeatedly reused over time, and as such are not unique over time. There are two obvious solutions for overcoming the problem associated with not having a time unique event identifier, both of which come with major drawbacks.

A first solution would be to always use the IP network 103 for program related interactions between a client system 113 and a server system 105. However, this has the disadvantage of limiting operators to select the most optimal network resources from a network load and scalability perspective. Furthermore, such a solution is poor for customers having unreliable IP connectivity.

A second solution would be to extend the DVB EIT data with a time unique alternative to the event_ID. Such a solution has the disadvantage of not being supported by many legacy software stacks (and DVB network infrastructure) in client systems 113 that cannot handle non standard DVB extensions. Such a solution also has the disadvantage of requiring more bandwidth to be used, i.e. since more data would be required to represent a larger number of unique programs. This increased bandwidth would lead to increased cost when transmitting over services such as satellite, which are known to be very expensive.

The embodiments described below overcome one or more of the disadvantages associated with the prior art described in the background, without having the disadvantages mentioned above.

The embodiments of the invention will be described below in the context of using program data, for example electronic program guide (EPG) meta-data, with digital video broadcast (DVB) standards and an Internet Protocol (IP) network. It is noted, however, that the concepts relating to the embodiments of the invention may be used with other standards and networks. The embodiments of the invention can therefore also be applied to other meta-data formats that share similar shortcomings as DVB.

The embodiments of the invention described below enable a TV solution infrastructure to be provided whereby server systems on a network side and client systems on a client side can support a wide range of EPG related use cases using both IP and DVB seamlessly.

As will be described in greater detail below, the embodiments of the invention make it possible to associate a time unique identifier with an event, for example a program in a television system. The time unique identifier is referred to below as a second identifier (or unique program identifier, program_ID) that is made available by a network entity (such as a server system) to a client entity (such as a client system or device, or another network entity that needs to determine the time unique identifier) via the program data in a protocol such as DVB. The embodiments of the invention enable the server system and all instances of client systems to be able to associate the same time unique identifier with a particular event (e.g. program), even if client systems might be offline, or miss earlier versions of the program data. Embodiments of the invention also enable server systems and client systems to associate the same unique identifier with a particular program even if the initially scheduled time to transmit a program changes.

Although the embodiments of the invention will be described with reference to associating a time unique identifier with an event, such as a television program, it is noted that various applications may further encapsulate or associate this information at other layers in the infrastructure, for example whereby a television program is associated with a particular television channel, or a channel with a particular operator.

As mentioned in the background section, program data sent over DVB to a client system contains a non time unique identifier (known as an event identifier event_ID), together with a Program Start Time. Both of these data structures are defined in the DVB standard, and are not extensions in the DVB protocol. The Program Start Time offers time perspectives, but since the Program Start Time can be changed, it cannot be used alone as a valid time reference for providing a guaranteed unique program identifier. This is also true for the event identifier, because an event_ID is only unique during a limited time period (i.e. during its repetition period)

and, due to its limitation of 16 bits and existing usage and rules in DVB, it cannot be misused for other purposes.

Figure 2:
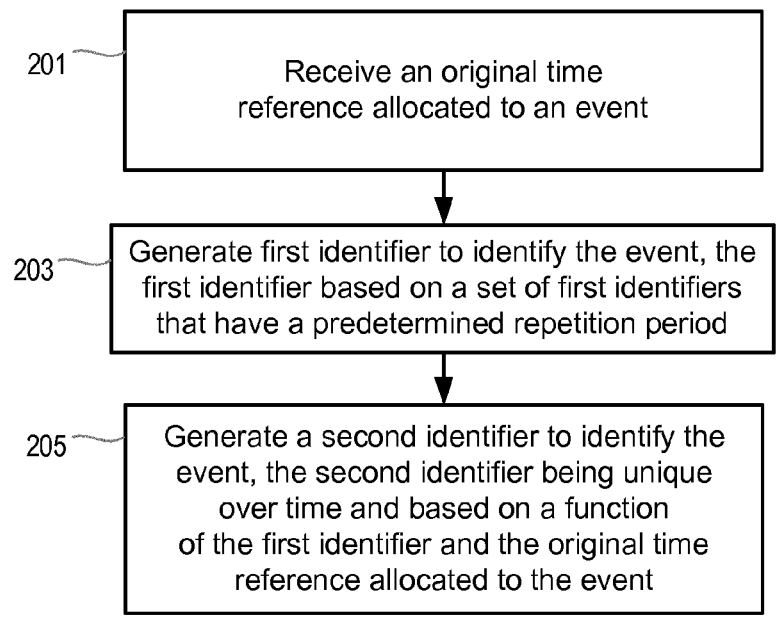
FIG. 2 shows a method performed at a network entity according to an embodiment of the invention.

FIG. 2 shows a method performed by an embodiment of the invention, in a network entity (such as a server system) for associating a unique identifier with an event. The event may be a television program, for example, although the techniques described in the embodiments of the invention can be applied to identify any type of event. The method may be performed, for example, in an ingest unit of a server system. The method comprises the step of determining an original time reference that has been allocated to an event. The original time reference may comprise, for example, a program start time that has been originally allocated to the event. It is noted that other time references may be used without departing from the scope of the embodiments of the invention, such as an end time (or some other time) associated with a particular event or program. The method comprises the step of generating a first identifier (event_ID) to identify the event, step 203, wherein the first identifier is based on a set of first identifiers that have a predetermined repetition period. For example, the first identifier can be taken from a set of first identifiers (such as a set of event identifiers, event_IDs) that are repeated every 3 calendar months. The method further comprises the step of generating a second identifier (program_ID) to identify the event, whereby the second identifier is unique over time and based on a function of the first identifier (event_ID) and the original time reference allocated to the event, step 205.

Such an embodiment enables a second identifier to be generated, which is an identifier that is unique over time. The second identifier can therefore act as a unique program identifier that can be determined based on a simple function of the first identifier (the event_ID) and the original time reference (such as the original start time allocated to a program).

In such an embodiment the second identifier (program_ID) can be defined as:

program_ID=<event_ID>+"_"+<OriginalStartTime>.

This second identifier can be determined at any network entity, for example at a server system and at a client system, such that both systems are able to reference the same event (e.g. program) using the second identifier that is unique over time.

It is noted that an embodiment such as that described above may not necessarily be able to reference the correct event (e.g. program) in a situation where the original time reference allocated to an event changes, for example whereby an original start time of a program changes, such as due to program rescheduling. When a client entity determines the second identifier in order to reference a particular event or program, the client entity does not necessarily know whether the time reference is the original time reference, or whether this time reference may have changed, and hence may determine a second identifier which references a different program to that referenced by a network entity.

Thus, according to a second embodiment, the method further comprises the step of partitioning a time line into blocks of time, each block of time having a unique block identifier. The blocks of time may be partitioned into calendar months, for example, although it is noted that other blocks or periods of time may also be used without departing from the scope of the invention. In such an embodiment the step of generating the second identifier (program_ID) comprises the step of generating the second identifier based on a function of the first identifier (event_ID) and the unique block identifier (block_ID) corresponding to a point in time where the original time reference (such as the original start time) falls.

According to this embodiment the second identifier (program_ID) can be defined as follows:

program_ID=<event_ID>+"_"+block_ID(<OriginalStartTime>).

The second identifier is therefore determined as a function of the first identifier event_ID and the block identifier block_ID (such as calendar month identifier) relating to the block of time (e.g. calendar month) where the original time reference (e.g. start time) falls. As above, this can be calculated at any network entity, such that both a server system and a client system can reference the same time unique identifier.

This particular embodiment allows the start time of an event or program to move in time, yet still allow a time unique identifier to be used to reference the event or program.

Although this second embodiment has advantages over the first embodiment, it may still have certain limitations in terms of enabling an identifier that is unique over time to be established when an original time reference (such as start time) is rescheduled such that it moves across a boundary from one block of time to another, for example from one calendar month to another. In practice, it is likely that changes to program start times will need to cater for start times that move across boundaries in this way, for example across calendar months.

Thus, according to a third embodiment of the invention the method further comprises the steps of sub-partitioning the blocks of time into a predetermined number M of different block classes (BlockClass$_{1-M}$), and allocating a different block class to adjacent blocks of time along the time line.

From the above it follows that the original time reference (e.g. original start time) allocated to an event falls into a particular block of time identified by a unique block identifier (block_ID), and wherein the block of time (and hence the block identifier) also comprises a block class assigned to it. By partitioning the time line into blocks, and allocating each block to a block class, this enables the second identifier (the identifier which is unique over time) to be determined later by another network entity such as a client device, even if the start time has moved across a boundary from one time block to another, for example from one calendar month to another.

As will be seen from below, this allocation of block classes enables changes in the original time reference (start time) to be compensated for when determining the second identifier.

The second identifier (program_ID) can be defined as follows:

program_ID=<event_ID>+"_"+Block(<OriginalStartTime>), where Block relates to the block identifier (block_ID) that defines a static block of time based on the original time reference allocated to the event, for example the original start time, and whereby the block of time also has a block class assigned thereto. The block_ID can be, for example, a numerical number representing the number of calendar months since January 1970. As such, a time line is partitioned into blocks of time referenced from a fixed point in time, such as January 1970, each block of time having an unique block identifier, for example a numeric value. According to one example the numerical value can increment block by block from the fixed point in time (for example whereby a numerical value such as "505" represent February 2012, and "506" represents March 2012, etc.). The blocks of time are also sub-partitioning into a predetermined number M of different block classes (BlockClass$_{1-M}$), for example 3 block classes in a Modulo 3 system. A different block class is repeatedly allocated to consecutive blocks along the time line, such that successive blocks have different block classes.

As will be described in greater detail later in the application, this combination of features enables any network entity, including a client entity or device, to determine a second identifier which is unique over time, by using the block class information to resolve any issues resulting from the original time reference shifting in time (or not being available in the first place to the client entity).

Referring to FIGS. 3a to 3f, a more detailed explanation will be given of how the blocks of time and block classes may be used. FIGS. 3a to 3f show how a time line is divided or partitioned into blocks of time, for example calendar months.

For example, referring to FIG. 3a each calendar month (UTC) represents a block of time. It is noted that a block can be of any length of time. As mentioned above, each block is assigned a unique block identifier (block_ID), for example a numerical value which increments over time, block by block from a fixed point in time.

Referring to FIG. 3b, each month is shown as being identified by a number representing the number of calendar months since January 1970. The block of time relating to December 2011 is shown as being assigned the block identifier 503, the block of time representing January 2012 is shown as being assigned the block identifier 504, and so on.

Each block of time is classified into a plurality of different block classes M, for example into 3 different block classes 0, 1, 2. It is noted that other numbers of block classes can be used in different embodiments, such as M=5, M=7, M=9 and so on. The block classes are assigned alternatively to blocks of time along the time line, as shown in FIG. 3c. In the example of FIG. 3c this represents a modulo-3 class of the Block ID;

BlockClass=BlockID mod3.

In FIG. 3c January 2012 is assigned a block class "0", February 2012 a block class "1", March 2012 a block class "2", with this being repeated again starting with block class "0" allocated to Aril 2012.

When a new program is to be ingested in a network entity, it will be assigned a first identifier, such as an event identifier (event_ID). The event_ID may be generated as follows, based on the block identifier (block_ID) and the block class (Block Class).

When a new event such as a program is to be published, it is assigned to a block by its start time. For example, referring to FIG. 3d, if the start time falls under February 2012 (UTC) it will be assigned the block_ID: 505. It is noted that the block class "Block Class: 1" has been assigned to this block of time when the blocks of time were sub-partitioned to have block classes assigned to them.

Before being published on DVB, the event needs a first identifier, event_ID. In existing systems the event_ID is typically a 16-bit field, for example. It is noted, however, that the embodiments of the invention are intended to work with an event identifier which comprises any number of bits. The embodiments of the invention transfer additional information relating to the block class within the event_ID, either explicitly or implicitly, as will be described in greater detail later in the application.

A first identifier, event_ID, will therefore contain information about which block class the event belonged to at the time of ingestion (the original time reference allocated to the event), with the time of ingestion being represented by the block indicator. In one example the event_ID is based on a 16 bit integer, and its modulo-3 class will indicate the block class of the event:

event_id mod3=<Block Class>

For example, events scheduled in February 2012 will be allocated first identifiers, such as event identifiers where event_id mod3=1. In the example shown in FIG. 3e, a first identifier event_id=22 is chosen from the set of possible first identifiers.

Referring to FIG. 3f, as further examples another event in February 2012 is allocated a first identifier event_id=25 (Block Class 1) and an event in March 2012 is allocated a first identifier event_id=14 (Block Class 2).

Thus, the step of generating the first identifier (event_ID) comprises the step of explicitly or implicitly providing the block class information in the first identifier.

Figures 4, 5A, 5B, 5C, 5D:
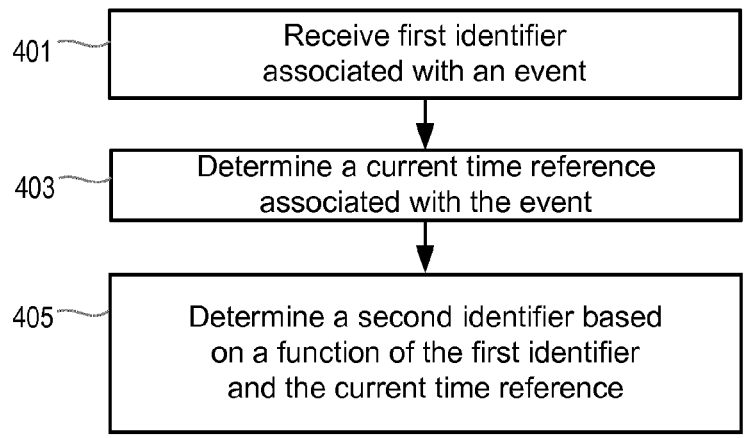
FIG. 4 shows a method performed at a client entity according to an embodiment of the invention.
FIGS. 5a to 5d illustrate examples of how a time unique identifier can be determined.

FIG. 4 shows a method performed by another embodiment of the invention, in a network entity such as a client entity or client system or device, which is configured for determining a second identifier (program_ID) associated with an event, wherein the second identifier is unique over time.

The method comprises the steps of receiving a first identifier (event_ID) associated with the event, step 401. The first identifier may be an identifier that has been generated previously by a network entity as described above, for example using a first identifier taken from a set of such first identifiers which repeat over a predetermined repetition period (for example every 3 calendar months). In step 403 a current time reference associated with the event is determined. A second identifier (program_ID) is determined based on a function of the first identifier and the current time reference, step 405. It is noted that steps 401 and 403 do not need to be performed in any particular order, and may even take place concurrently.

As mentioned earlier, a client entity or client system may never have received the "original" time reference (e.g. never received the original start time). Further, the client system may have received an update on the original start time. As a consequence the client system can never assume that the time reference it receives, i.e. the "current" time reference, is the original time reference. For example, the client entity cannot assume that the current start time is the original start time.

Therefore, in an embodiment where a time line is partitioned into blocks of time, each block of time having a unique block identifier, the method performed at the client entity for determining the second identifier based on a function of the first identifier and the current time reference may further comprise the steps of determining the second identifier based on a function of the first identifier and a unique block identifier corresponding to the point in time where the current time reference falls.

According to such an embodiment the second identifier (program_ID) is determined at the client system as follows:
program_ID=<event_ID>+"_"+Block(<event_ID>,<CurrentStartTime>),
where the Block function always produces the same result as if it was fed by the original start time. This is how the client system is able to determine its unique second identifier (program_ID) for an event, the identifier that is unique over time.

The function "Block(<event_ID>,<CurrentStartTime>)" enables this embodiment of the present invention to provide an unique identifier, regardless of whether the original time reference has changed.

The CurrentStartTime will indicate a Block of time that is not necessarily correct (i.e. if start time has moved), but that does not differ more than a certain number of blocks (either earlier or later blocks) if the event has shifted in time. For example, in an embodiment having 3 block classes assigned thereto, the method is able to handle time references which have moved +/−1 block earlier or later. In an embodiment in which 5 block classes are assigned to different blocks of time, the method is able to handle time references which have moved +/−2 blocks earlier or later, and so on for further numbers of block classes.

With reference to FIGS. 5a to 5d, further details will now be provided in connection with how embodiments of the invention determine the second identifier (program_ID) based on the first identifier (event_ID) and current time reference received at a network entity such as a client entity.

A client application that receives an event needs to be able to determine the second identifier (program_ID) which is unique over time based on only the data it receives in the first identifier and information relating to the current time reference allocated to that first identifier. The first identifier (event_ID) is given directly, with the block identifier (block_ID) being more complex to determine, based on the current time reference (current start time) received at the client entity.

The block identifier, block_ID, is determined based on the current time reference (e.g. current start time) as follows. If the current start time allocated to Event 22 is during February 2012 (UTC), in the simplest case the block_ID would be 505, for example as previously shown above in FIG. 3e for Event 22. The second identifier (program_ID) is determined as:

program ID=22_505

A problem occurs, however, when the original time reference (such as the original start time) has changed across a block border since the time of event creation. Referring to the example of FIG. 5a, the Event 22 that originally belonged to Block 505 now has a current time reference (current start time) in Block 504. This would indicate a second identifier (program ID) of 22_504, which does not reference the correct program.

To resolve this situation an application on a client side (a client application) will compare the original Block Class of the first identifier, Event 22, with the current Block Class. Based on the result, the step of determining the second identifier (such that it is an unique program identifier over time) is resolved by shifting the block identifier as necessary, depending on the result of the block class comparison.

If original block class is the same as the current block class, then the current block identifier, block_ID, is used as the block identifier for determining the second identifier (program_ID) as follows:

program ID=<event_id>_<block_ID>.

For example, referring to FIG. 5b, if Event 14 has moved within Block 506, then the first identifier, event_ID=14, indicates a Block Class equal to 2, both for the original time reference and the current (shifted) time reference (i.e. same). Therefore, the second identifier (program_ID that is unique over time) is determined as:

program_ID=14_506

Thus, the same program will be referenced regardless of the shift in time for Event 14.

However, referring to FIG. 5c, if the original block class for Event 22 indicates the future neighboring block, then the value of the block identifier of the current block must be incremented by 1, such that the second identifier (program_ID that is unique over time) is determined as:

program_ID=<event_id>_(<block_ID>+1)

In the example of FIG. 5c the Event 22 has been rescheduled back in time into block 504. The first identifier (event_ID=22) received by a client device indicates an original Block Class=1 (future neighboring, i.e. which corresponded to block 505), even though the current time reference indicates a Block Class=0 (i.e. for block 504 corresponding to the current time reference). As such the block identifier is resolved as Block ID=504+1=505. The second identifier (program_ID) is then determined as:

program_ID=22_505

It can be seen from the above that the shifting of the block identifier enables the correct program to be referenced using the second identifier (program_ID), even though the program has been rescheduled in time.

Referring to FIG. 5d, if the original block class indicates the past neighboring block, then the value of the block identifier of the current block is decreased by 1, such that the second identifier (program_ID that is unique over time) is determined as:

program_ID=<event_id>_(<block_ID>−1).

In the example of FIG. 5d, the Event 25 has been rescheduled forward in time, into Block 506. The first identifier (event_ID=25) indicates an original Block Class=1 (past neighboring), even though the current time reference indicates a Block Class=2. As such the block identifier is resolved as block ID=506−1=505. The second identifier (program_ID) is then determined as:

program_ID=25_505

It is noted that although the examples described above refer to block identifier values which comprise numeric values which increment in time by one, the embodiments of the invention are equally applicable to systems where the block identifiers decrease over time from a large value associated with a fixed point in time in the past, or whereby the relationship between one block identifier and an adjacent block identifier is some other function, for example incrementing (or decreasing) in steps of 2, 3, etc. All that is required is that, upon determining that a change of block class is detected, the block identifier is then shifted by the corresponding function.

In the embodiment described above the step of determining the second identifier (program_ID) comprises the steps of: determining a block class originally assigned to the event using block class information determined from the first identifier; comparing the determined block class with a block class corresponding to the current time reference; and using the result of the comparison step to adjust a value of the unique block identifier, if necessary, when using the unique block identifier to determine the second identifier.

The step of adjusting the value of the unique block identifier may comprise the steps of: determining if the block class originally assigned to the event indicates a block which is one or more blocks in the future and, if so, changing the value of the unique block identifier to reflect the block identifier of said block which is one or more blocks in the future; or, determining if the block class originally assigned to the event indicates a block which is one or more blocks in the past and, if so, changing the value of the unique block identifier to reflect the block identifier of said block which is one or more blocks in the past.

An example of a pseudo-code for performing the functions described in FIGS. 5a to 5d is shown in FIG. 6.

As can be seen from the above, the block class information provided within the first identifier, event_ID (either explicitly or implicitly as described in further detail below), enables a client system to resolve the "original" block where the time reference was allocated, and hence enables a time unique reference to be provided.

The step of determining which block class is originally assigned to the event may comprise the steps of checking one or more bits of the received first identifier (event_ID) to determine the block class. Alternatively, the step of determining which block class is originally assigned to the event may comprise the step of determining the original block class in an implicit manner based on a numerical value of the received first identifier.

Figure 7:
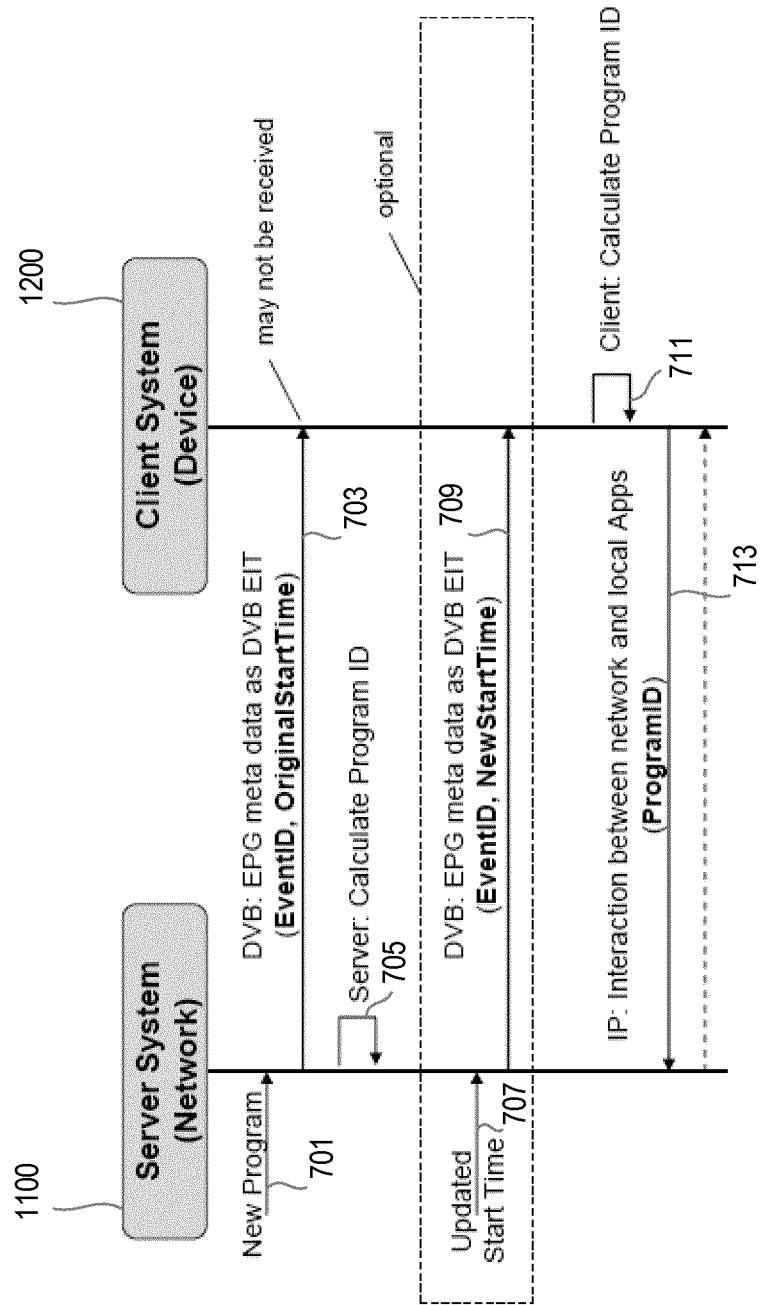
FIG. 7 shows an example of a high level interaction diagram between a network entity (such as a server system) and a client entity (such as a client system or device)

FIG. 7 shows a high level interaction diagram of the interaction between a network entity 1100 (for example a server system) and a client entity 1200 (for example a client system) according to an embodiment of the invention. In step 701 the server system 1100 receives data relating to a new event, such as a new program, and sends program data such as EPG meta data in the form of a DVB Event Information Table (DVB EIT) to the client system 1200. The EPG meta data contains a first identifier (event_ID) that has been generated as described above, and an original time reference, such as an original start time for the program. It is noted that this EPG meta data may not necessarily be received by the client system 1200, for example if the client system 1200 was turned off when the EPG meta data was distributed from the server system 1100.

The server system 1100 is able to calculate a second identifier (program_ID) which is unique over time for the event (e.g. a unique program identifier), based on a function of the first identifier (event_ID) and the original time reference (e.g. original start time) as described above.

Steps 707 and 709 shows steps that may be performed if the original time reference associated with the event (such as the original start time of a program) is changed for some reason, such as being updated to reflect a change in schedule. In such a scenario an updated time reference (updated start time) is received by the server system 1100, step 707. The server system sends EPG meta data to the client system 1200 comprising a first identifier (event_ID) and the new reference time (e.g. new start time), step 709.

In step 711 the client system 1200 determines the second identifier (program_ID which is unique over time) using the techniques described in FIGS. 4 and 5a-5d (and as described in further detail later in the application). The determination of the second identifier takes place regardless of whether the time reference is the original time reference (such as an original start time) or an updated time reference (such as a new start time). In other words, the client system 1200 is able to resolve the second identifier (program_ID) based on a function of the non time unique first identifier (event_ID) and the current time reference, even if the original time reference (e.g. original start time) has been updated with a new time reference (e.g. new start time).

Figure 8:
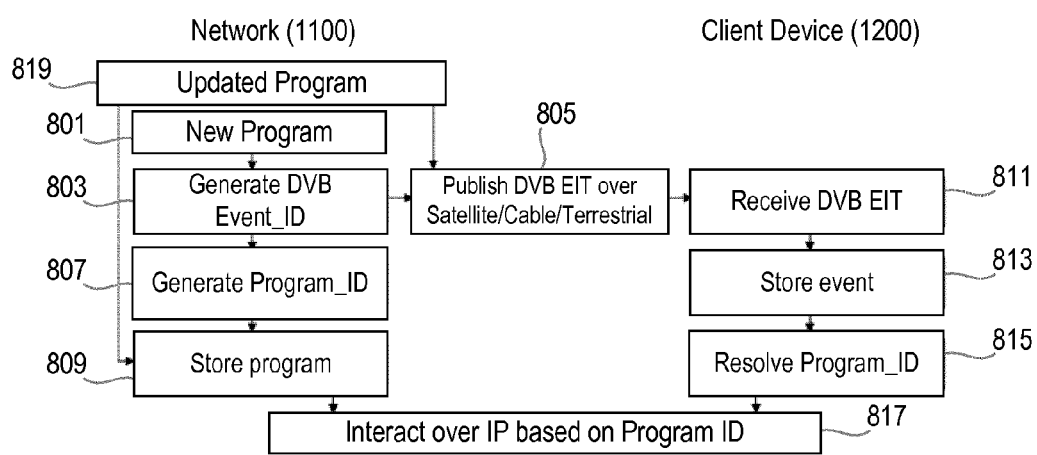
FIG. 8 is an example of a basic flow chart of the distribution of electronic program guide data according to an embodiment of the invention.

FIG. 8 shows a flow chart depicting how EPG data is distributed between network elements and devices, and how a unique program identity is then established by a network side 1100 and determined by a client device 1200. In step 801 a new program is ingested into the system, for example using an ingest unit within a server system 1100. A first identifier, for example an event identifier (event_ID) will be generated according to the techniques described in the embodiments of this application, step 803, and the meta-data will be persisted both in the network and on the devices. This will include generating a second identifier, for example the unique program identifier (program_ID) in the network side, step 807, and storing the program for subsequent use. The event identifier (event_ID) is also published or broadcast to the client side 1200, for example over Satellite, cable or terrestrial systems, step 805. A client device receives the published event identifier, step 811, stores the event in step 815, and in step 815 determines the second identifier, the unique program identifier (program_ID) using the techniques described in the embodiments of the present invention.

Interactions can then take place seamlessly over IP (and DVB), step 817, based on the second identifier (program_ID) which is a unique program identifier which exists both at the network side 1100 and the client side 1200.

The program meta-data may get updated in step 819, for example if the broadcast schedule changes, and these changes will also be distributed and persisted both in the network 1100 and on the devices 1200 in a similar manner to that just described. The embodiments of the invention allow such updates to take place in view of how the program_ID is resolved on the client devices 1200 in order to use a shared time unique identifier for application interactions between client devices 1200 and network elements 1100.

It will be appreciated from the above that embodiments of the invention base the time unique program_ID on the event_ID and the original start time of the DVB EIT tables. The embodiments of the invention create a domain where it is possible to associate the very granular start time with something less granular, by using the block identifier (block_ID) and assigning different block classes (Block Class) to different blocks, as defined above and in greater detail below.

Further details will now be given about the first identifier described above, for example an event identifier (event_ID) used in a DVB application, and how this can be used to convey the block class information that is used by the embodiments of the invention to resolve time shifts in an original time reference allocated to an event.

According to one embodiment the block class information is conveyed using one or more bits taken from a predetermined number of bits normally assigned to provide the first identifier (event_ID).

According to an alternative embodiment, the block class information is conveyed by partitioning the set of first identifiers (event_IDs) into a plurality of sub-sets, and using each sub-set to represent a different block class. This enables the block class information to be conveyed implicitly.

Therefore, the step of generating the first identifier (event_ID) may comprise the step of explicitly or implicitly providing the block class information in the event identifier.

These embodiments therefore embrace different ways of conveying the block class information in the first identifier (event_ID), either by stealing one or more bits from the bits normally used to convey event_ID (an explicit method of conveying the information), or by using a partitioning technique to convey this information implicitly, without stealing any bits from the event_ID. By assigning first identifiers from each sub-set to different block classes when generating the first identifiers, this means that a particular value of a first identifier can also be used to implicitly convey a block class assigned thereto.

According to one example the first identifier, event_ID is a 16 bit identifier that repeats at a certain repetition period, for example every 3 calendar months. It is noted that the embodiments of the invention can be used with first identifiers that have a different size, or which repeat at different intervals. Before a first identifier event_ID of a new event (e.g. program) is defined, the original start time is analyzed.

The original start time of each event will fall into a block of time. The event_ID will carry an indication about what block it originally belonged to, and in particular what class of block it belongs to.

Preferably, as few bits of the first identifier (event_ID) as possible are used to convey the block class, to avoid lowering the repetition period of the event identifier. It is noted that this does not violate any rules of how a DVB event_ID can be used.

Figure 9:
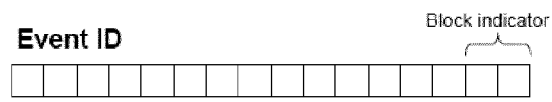
FIG. 9 shows an example of a modified identifier according to an embodiment of the invention.

FIG. 9 shows an example whereby one or more bits, two bits in the example (or 1.5 bits to be more precise for a modulo 3 system), are used to convey the block class information in an explicit manner. In the example of FIG. 9 the two least significant bits are dedicated for this purpose. The value of these bits will indicate the block class assigned to a respective block identifier. As mentioned above, it is noted that in a modular 3 embodiment only 1.5 of such bits will be needed to convey the block class information. A different number of bits can be used to convey the block class information depending upon what modular system is used, for example M=5, M=7, M=9, etc.

Further details about how the block class can be conveyed in an implicit manner in the first identifier (event_ID) will now be described with reference to FIGS. 10 to 13.

A first identifier (an event identifier or event_ID) can be assigned a value from a set of first identifier values that are possible from the bits allocated for defining the first identifiers (event_IDs). For example, if the first identifiers (event_IDs) are defined using 16 bits as per the DVB standard, this allows a possible $2^{16}$ first identifiers (event_IDs) to be provided. Such event_IDs can be generated using a counter mechanism, for example.

According to one embodiment a block class is conveyed by partitioning the set of first identifiers (event_IDs) into a plurality of sub-sets, and using each sub-set to represent a different block class M.

According to one embodiment, the step of partitioning the set of first identifiers into a plurality of sub-sets comprises the step of providing a counter mechanism for generating the first identifiers, wherein the counter mechanism comprises M sub-counters, and wherein each sub-counter generates first identifiers corresponding to a particular block class.

This method of sub-partitioning or using sub-counters to allocate first identifiers (event_IDs) has the advantage that none of the bits normally used to convey first identifiers (event_IDs) need to be stolen to convey the block class assigned to that particular first identifier.

This is the case since the number of block classes multiplied by the block length is less than or equal to the repetition period, in order to be able to uniquely identify a block class during a repetition period and apply the previously described algorithm where the block identifier is adjusted. Therefore the identifiers from a sub-partition will be consumed at the same pace as without the method of sub-partitioning, and as such no additional consumption of the values from the first identifier occurs.

It is noted that, although the embodiments of the invention have been described with reference to the number of block classes multiplied by the block length being equal to the repetition period (i.e. 3×1 calendar month=3 calendar month repetition period), the sub-partitioning of time does not necessarily need to take place in this way. Instead, if desired block lengths of different durations may be used within a particular repetition period, or different block classes assigned to block lengths in different ways. A "large" block length means that it is less likely that first identifiers (event_IDs) from within that sub-partition will be over-consumed. However, in certain applications it may be desirable to partition the block lengths such that a particular sub-partition of time enables more first identifiers (event_IDs) to be available during that period, for example if weekends tend to have more programs being scheduled than weekdays. It is therefore noted that the general concepts covered by the embodiments of the invention are intended to embrace these other possibilities.

Figure 10:
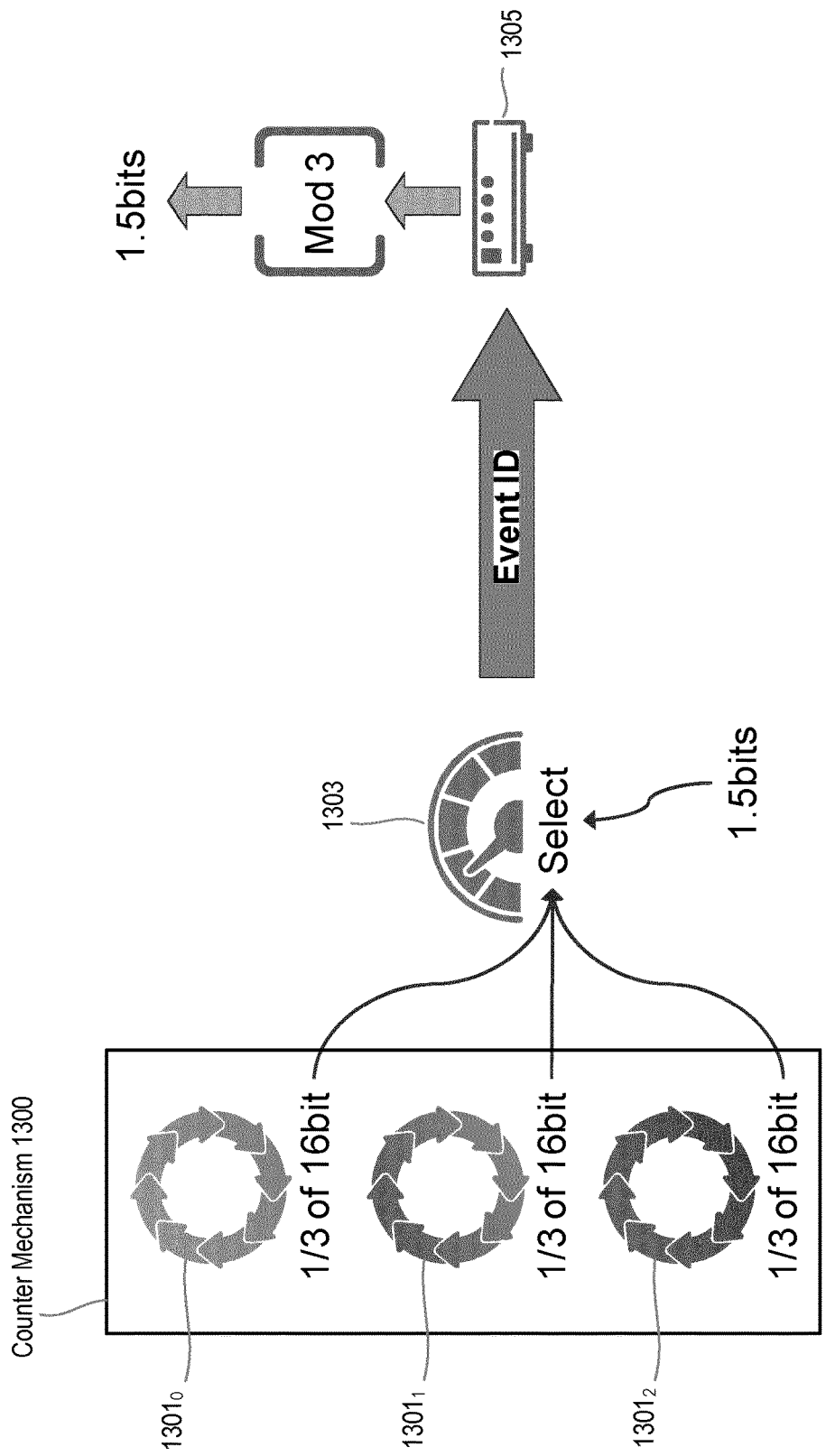
FIG. 10 shows an example of a counter mechanism for generating identifiers according to an embodiment of the invention.

FIG. 10 shows a structure of a counter mechanism 1300 according to an embodiment of the invention, which enables a block class of a first identifier (event_ID) to be conveyed along with the first identifier value itself, and without stealing any bits from the number of bits normally available for providing first identifiers (i.e. without stealing any of the 16 bits in the example above).

This is accomplished by partitioning the counter mechanism 1300 of FIG. 10 into separate sub-counters, for example $1301_0$ to $1301_2$. In other words, the counter mechanism is partitioned into a number of sub-counters which correspond to the number M of different block classes to be identified or conveyed. In the examples of FIGS. 3 and 5 three different block classes were used, which corresponds to the use of the three sub-counters shown in FIG. 10. It is noted that any number of sub-counters can be used, depending on the number of block classes to be conveyed.

The set of first identifiers are therefore partitioned into different sub-sets, each sub-set representing or having a respective block class. As such, each sub-counter $1301_0$ to $1301_2$ is responsible for generating first identifiers in a particular block class. For example, the counter $1301_0$ may be responsible for generating a third of the first identifiers (a third of the event_IDs) having a block class "0" (sub-set 0), the counter $1301_1$ responsible for generating a third of the first identifiers having a block class "1" (sub-set 1), and the counter $1301_2$ responsible for generating a third of the first identifiers having a block class "2" (sub-set 2). A selecting unit 1303 is provided for assigning first identifiers (event_IDs) from each of the counters $1301_0$ to $1301_2$ to different blocks of time. For example, with reference to FIG. 3c, events falling in the block of time corresponding to January 2012 (i.e. sub-set 0) may be generated using counter $1301_0$, events falling in the block of time corresponding to February 2012 (sub-set 1) generated using counter $1301_1$, and events falling in the block of time corresponding to March 2012 (sub-set 2) generated using the counter $1301_2$. The first identifiers (event_IDs) are then broadcast or published in the normal manner using DVB, for example using a device 1305. A client device receiving a first identifier (event_ID) will be able to resolve which block class has been assigned to the first identifier, by determining which sub-set the received event identifier belongs to.

According to one embodiment the sub-set 0 can be the $1^{st}$ third of first identifiers (i.e. $1^{st}$ third of event_ID numbers), sub-set 1 the $2^{nd}$ third of event_IDs, and sub-set 2 the $3^{rd}$ third of event_IDs. According to another embodiment, the first identifiers can be allocated in an interleaved manner, such that the module 3 of the first identifier value, for example, can be used to determine the block class assigned thereto. Whatever system is used will be known to both the network entity and the client entity, either by defining this in advance, or during operation in some way.

The embodiments of the invention make it possible to send a time unique identifier from a server system to a client system via the program data in the DVB protocol, and for the unique program identifier to be resolved despite changes in start time, without using any bits from the first identifier (event_ID).

Further details about how the block class information can be derived implicitly from the first identifier (event_ID) will now be given with reference to FIGS. 11 to 13.

Referring to FIG. 11a, this shows a number of events (for example programs) scheduled with start times in November 2012. As can be seen, each event has a corresponding event identifier (first identifier). For example, a first identifier 304 has been generated for the event which has a start time of 12:15 on Nov. 1, 2012. Since all of the events fall within the same calendar month, it can be seen that all of the first identifiers are generated from a sub-set of first identifiers all having the same block class. For example, it can be seen that the first identifiers (event_IDs) are in steps of 3, such as 301, 304, 307, etc. This is due to the Modulo 3 format used in this example.

Therefore, when subsequently analyzed at a client system, the client system is able to deduce the block class corresponding to original time reference (the original start time) based on the MOD3 of the first identifier (event_ID). In other words, the MOD 3 of each of 301, 304, 307, 343 and 313 will be the same, and hence indicate the same block class.

FIG. 11b shows a table where events scheduled for October 2012 have first identifiers (event_IDs) such as 900, 903, 906, 909. However, it can be deduced that the event that is identified with the first identifier (event_ID) of 310, for the event currently scheduled for 16:00 on Oct. 30, 2012, is an event that has been rescheduled from some other original start time (in this case November 2012). As such, the block class of event 310 is different to the block class of the other scheduled events for October 2012.

This can be explained further with reference to FIG. 12. The events identified by the first identifiers 900, 903, 906, 310, 909 are each scheduled for the calendar month of October 2012. The block identifier "X" associated with October 2012 is "513" for example (assuming the block identifiers are referenced to January 1970). The current block class "Xmod" assigned to each of these events, i.e. corresponding to where the current start time falls, is "0".

The block class of the event at the time when it was originally scheduled, i.e. based on the original time reference (original start time) is "0" for each of the events identified by 900, 903, 906 and 909, but different for the event identified with the first identifier 310. In other words, it can be deduced from the first identifier 310 that a block class of 1 was originally assigned to that event, which is different to the block class corresponding to the current point in time where it is scheduled. This enables an adjusted block identifier to be determined (Adjusted X) for use in determining the second identifier (program_ID).

For the events identified with first identifiers corresponding to 900, 903, 906 and 909 (i.e. where there has been no change in block class detected), then no adjustment is necessary and the second identifier (program_ID) can be determined as a function of 513_900; 513_903; 513_906 and 513_909, respectively. However, for the event 310 the block identifier value is adjusted from 513 to 514, such that the second identifier is then determined as a function of 514_310 (so that it references the correct program).

FIG. 13 summarizes the modifications that are required to a block identifier value, depending on the comparison of the block class values.

It is noted that the degree by which the original start time is able to move in time, and still enable the unique identifier to be determined, is determined by the number of block classes used in a particular embodiment, and the size of each block of time. For example, if each block comprises a calendar month, and the number of block classes M=3 (i.e. three block classes assigned to the blocks), then the start time of a program will be able to move +/−1 month and still allow the second identifier (that is unique over time) to be determined. In an embodiment whereby each block comprises 1 calendar month, and M=5 (i.e. 5 block classes assigned to the blocks), then a start time of a program will be able to move −/−2 months and still allow the second identifier (that is unique over time) to be determined. Similar scenarios apply for M=7, M=9, and so on. Such limitations to the degree by which the start time can move are not true limitations in practice, since broadcasters typically do not plan their future schedule of programs very long in advance, and end-users typically cannot browse future EPGs that long into the future.

Figure 14:
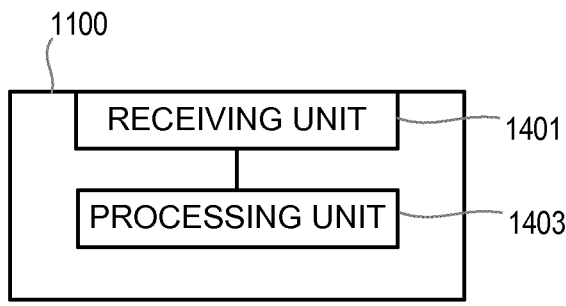
FIG. 14 shows an example of a network entity according to an embodiment of the invention.

FIG. 14 shows a network entity 1100 according to an embodiment of the invention. The network entity is adapted to associate an identifier that is unique over time with an event. The network entity 1100 comprises a receiving unit 1401 for receiving an original time reference allocated to the event. A processing unit 1403 is adapted to generate a first identifier (event_ID) to identify the event, the first identifier being based on a set of first identifiers (event_IDs) that have a predetermined repetition period. The processing unit 1403 is further adapted to generate a second identifier (program_ID) to identify the event, wherein the second identifier is unique over time and based on a function of the first identifier and the original time reference allocated to the event.

When a time line is partitioned into blocks of time, each block of time having a unique block identifier, the processing unit may be further adapted to generate the second identifier based on a function of the first identifier and the unique block identifier corresponding to a point in time where the original time reference falls.

When blocks of time are further sub-partitioned into a predetermined number M of different block classes (Block-Class$_{1-M}$), the processing unit may be further adapted to allocate different block class to adjacent blocks of time along the time line. In such an embodiment the processing unit may be further adapted to explicitly or implicitly provide the block class information in the first identifier when the first identifier is being generated.

For example, the processing unit may be adapted to conveyed the block class information using one or more bits taken from a predetermined number of bits normally assigned for providing the first identifier. Alternatively, the processing unit may be adapted to conveyed the block class information by partitioning the set of first identifiers (event_IDs) into a plurality of sub-sets, and use each sub-set to represent a different block class M.

The network entity may also comprise a counter mechanism as described above with reference to FIG. 10 for generating the first identifiers, wherein the counter mechanism comprises M sub-counters, and wherein each sub-counter generates first identifiers corresponding to a particular block class.

Figure 15:
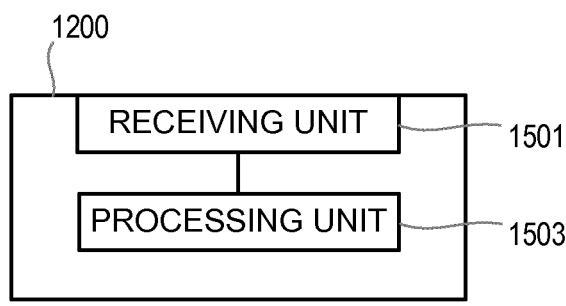
FIG. 15 shows an example of a client entity according to an embodiment of the invention.

FIG. 15 shows a client entity 1200 according to an embodiment of the invention, for determining a second identifier (program_ID) associated with an event, wherein the second identifier is unique over time. The client entity 1200 comprises a receiving unit 1501 for receiving a first identifier (event_ID) associated with the event. A processing unit 1503 is adapted to determine a current time reference associated with the event. The processing unit 1503 is further adapted to determine the second identifier (program_ID) based on a function of the first identifier and the current time reference.

It is noted that the techniques described herein for conveying block class information implicitly within an event identifier may be used more widely for conveying any other information in such a manner.

Figure 16:
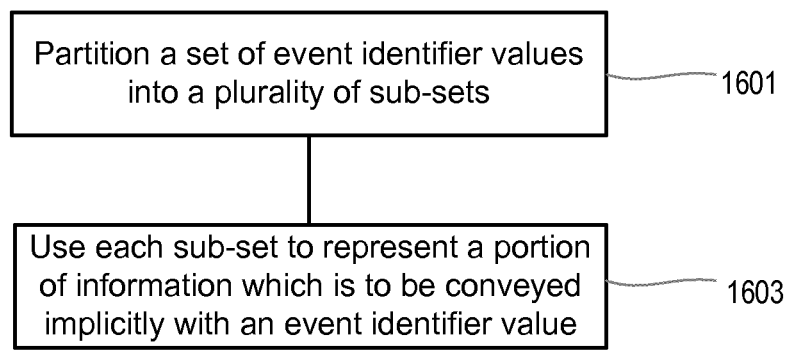
FIG. 16 shows a method according to another embodiment of the invention.

Thus, according to another aspect of the invention, as shown in FIG. 16, there is provided a method of conveying implicit information via an event identifier used in a digital video broadcast protocol. The method comprises the steps of partitioning a set of event identifier values into a plurality of sub-sets, step 1601, and using each sub-set to represent a portion of information which is to be conveyed implicitly with an event identifier value, step 1603.

With such an embodiment the method may further comprise the steps of using a counter mechanism to generate an event identifier value, whereby the counter mechanism comprises a plurality of sub-counters, each sub-counter being used to generate a specific sub-set of event identifier values, such that a remote device can deduce implicit information from the event identifier value being received, based upon which sub-set the event identifier relates to.

The embodiments of the invention have the advantage of allowing operators or users to select the most optimal network resources in regards of network load, scalability and IP connectivity.

The embodiments of the invention also have the advantages of removing the need to extend the DVB EIT, reducing the required DVB bandwidth and supporting legacy software stacks in client systems.

The embodiments of the invention also make it possible to allow both local applications and network applications to share the same identifier to address the same entity, which simplifies application program interactions and reduces the likelihood of bugs being introduced.

A further advantage of the embodiments of the invention is that network operators can provide unique program identifiers over DVB without having to pay for increased bandwidth, which would otherwise be necessary if the event identifier feature of DVB was expanded such that all programs were uniquely identifying using the event_ID feature only.

The embodiments of the invention also enable application developers to refer to a program identifier (program_ID) when developing their applications, independently of how the EPG metadata is received by a client system. The embodiments of the invention provide a seamless merger between HTTP and DVB, since the program identifiers are the same in both.

The embodiments are also backward compatible with existing systems. Furthermore, no development work is needed to set-top-boxes, network controllers or DVB equipment to handle DVB extensions It is noted that in the examples described above the start time is referenced from a fixed point in time, such that the start time thereby conveys the date or month in which the start time falls, as well as the time of day. It is noted that other fixed points in time can be used as the reference point, without departing from the scope of the invention As well as dealing with changes to program start times, certain embodiments also deal with the situation where the client does not successfully receive the original program start information (for example whereby a client set-top-box was turned off when the EPG information was being distributed, or whereby the EPG data is only distributed for part of the days ahead.

In the examples described above the repetition period of the set of first identifiers (event_IDs), for example 3 calendar months, divided by a block of time, for example 1 calendar month, is an integer value. It is noted, however, that other repetition period and block durations can be used.

If desired, when a request to update the start time of a program is received, a network entity may be configured to determine whether the updated start time is more than a certain number of block periods from the original start time and, depending on the number of block classes being used to classify the blocks of time, such information can be used to allow or reject a program update request.

From the embodiments described above it can be seen that an ingested program can be assigned a time unique Identifier, in the form of a unique program identifier, for example in a server system, while the server system also generates corresponding information to be sent via DVB, for enabling a client system to subsequently determine the unique program identifier. Embodiments of the invention show how a client system can resolve the time unique program identifier based on a function of a non time unique event identifier (event_ID) and an original time reference (such as the program start time), even if the program start time has been updated.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a network entity for associating a unique identifier with an event, the method comprising the steps of:
    partitioning a time line into blocks of time, each block of time having a unique block identifier;
    receiving an original time reference allocated to the event;
    sub-partitioning the blocks of time into a predetermined number M of different block classes (BlockClass1-M);
    allocating a different block class to adjacent blocks of time along the time line;
    assigning a block class for the event based on the original time reference;
    generating a first identifier (event_ID) to identify the event, wherein the first identifier is based on a set of first identifiers (event_IDs) that have a predetermined repetition period, and wherein the first identifier comprises information indicating the assigned block class for the event; and
    generating a second identifier (program_ID) to identify the event, wherein the second identifier is unique over time and based on a function of the first identifier and the unique block identifier corresponding to a point in time where the original time reference allocated to the event falls, wherein the second identifier (program_ID) is configured to be determined based on a function of the first identifier (event_ID) and a current time reference associated with the event.

2. The method as claimed in claim 1, wherein the block class is conveyed using one or more bits taken from a predetermined number of bits normally assigned for providing the first identifier.

3. The method as claimed in claim 1, whereby the block class is conveyed by:
  partitioning the set of first identifiers (event_IDs) into a plurality of sub-sets; and
  using each sub-set to represent a different block class M.

4. The method as claimed in claim 3, wherein the step of partitioning the set of first identifiers into a plurality of sub-sets comprises the step of providing a counter mechanism for generating the first identifiers, wherein the counter mechanism comprises M sub-counters, and wherein each sub-counter generates first identifiers corresponding to a particular block class.

5. The method as claimed in claim 1, wherein each block of time is referenced from a fixed point in time, and wherein a block identifier comprises a numerical value which increments block by block from the fixed point in time.

6. The method as claimed in claim 1, wherein the first identifier is an event identifier of a digital video broadcast protocol, or wherein the original time reference is a start time allocated to an event in a digital video broadcast protocol.

7. A method in a client entity for determining a second identifier (program_ID) associated with an event, wherein the second identifier is unique over time, the method comprising the steps of:
  receiving a first identifier (event_ID) associated with the event;
  determining a current time reference associated with the event, wherein a time line is partitioned into blocks of time, each block of time having a unique block identifier, wherein the blocks of time are sub-partitioned into a predetermined number M of different block classes (BlockClass1-M), and wherein a different block class is allocated to adjacent blocks of time along the time line;
  determining a block class originally assigned to the event using block class information determined from the first identifier;
  comparing the determined block class with a block class corresponding to the current time reference;
  based on the comparison, adjusting a value of a unique block identifier corresponding to the current time reference associated with the event; and
  determining the second identifier (program_ID) based on a function of the first identifier and the unique block identifier.

8. The method as claimed in claim 7, wherein the step of adjusting the value of the unique block identifier comprises the steps of:
  determining if the block class originally assigned to the event indicates a block which is one or more blocks in the future and, if so, changing the value of the unique block identifier to reflect the block identifier of said block which is one or more blocks in the future; and
  determining if the block class originally assigned to the event indicates a block which is one or more blocks in the past and, if so, changing the value of the unique block identifier to reflect the block identifier of said block which is one or more blocks in the past.

9. The method as claimed in claim 8, wherein block identifiers are numeric values that are incremented linearly over time, and wherein the step of changing the value of a block identifier comprises incrementing or decrementing a block identifier value to the block identifier value of a future or past block, based on the result of the comparison between the original block class and the current block class.

10. The method as claimed in claim 7, wherein the step of determining which block class is originally assigned to the event comprises the step of checking one or more bits of the received first identifier to determine the block class.

11. The method as claimed in claim 7, wherein the step of determining which block class is originally assigned to the event comprises the step of determining the original block class in an implicit manner based on a numerical value of the received first identifier.

12. A network entity adapted to associate an identifier that is unique over time with an event, the network entity comprising:
  a receiving unit for receiving an original time reference allocated to the event; and
  a processing unit adapted to:
    partition a time line into blocks of time, each block of time having a unique block identifier;
    sub-partition the blocks of time into predetermined number M of different block classes (BlockClass1-M);
    allocate a different block class to adjacent blocks of time along the time line;
    assign a block class for the event based on the original time reference;
    generate a first identifier (event_ID) to identify the event, the first identifier being based on a set of first identifiers (event_IDs) that have a predetermined repetition period; wherein the first identifier comprises information indicating the assigned block class for the event; and
    generate a second identifier (program_ID) to identify the event, wherein the second identifier is unique over time and based on a function of the first identifier and the unique block identifier corresponding to a point in time where the original time reference allocated to the event falls, wherein the second identifier (program_ID) is configured to be determined based on a function of the first identifier (event_ID) and a current time reference associated with the event.

13. A client entity adapted to determine a second identifier (program_ID) associated with an event, wherein the second identifier is unique over time, the client entity comprising:
  a receiving unit adapted to receive a first identifier (event_ID) associated with the event; and
  a processing unit adapted to determine a current time reference associated with the event, wherein a time line is partitioned into blocks of time, each block of time having a unique block identifier, wherein the blocks of time are sub-partitioned into a predetermined number NI of different block classes (BlockClass1-M), and wherein a different block class is allocated to adjacent blocks of time along the time line;
  determine a block class originally assigned to the event using block class information determined from the first identifier;
  compare the determined block class with a block class corresponding to the current time reference;
  based on the comparison, adjust a value of a unique block identifier corresponding to the current time reference associated with the event; and
  determine the second identifier (program_ID) based on a function of the first identifier and the unique block identifier.

14. A method in a network entity for conveying implicit information via a first event identifier used in a digital video broadcast protocol, the method comprising the steps of:
  partitioning a time line into blocks of time, each block of time having a unique block identifier;
  receiving an original time reference allocated to an event;
  sub-partitioning the blocks of time into a predetermined number M of different block classes (BlockClass1-M);
  allocating a different block class to adjacent blocks of time along the time line;
  assigning a block class for the event based on the original time reference;
  generating the first event identifier to identify the event, wherein the first event identifier is based on a set of event identifiers;
  partitioning the set of event identifier values into a plurality of sub-sets;
  using each of the plurality of sub-sets to represent a portion of information which is to be conveyed implicitly to a client entity with an event identifier value without stealing any bits from the first event identifier, wherein the information which is to be conveyed relates to the assigned block class for the event; and
  transmitting the first event identifier,
  wherein the first event identifier is configured such that implicit information is deduced from the first event identifier and a second event identifier unique over time is determined based on a function of the first event identifier and a current time reference associated with the event.

15. A method as claimed in claim 14, wherein the method comprises the steps of using a counter mechanism to generate an event identifier value, whereby the counter mechanism comprises a plurality of sub-counters, each sub-counter being used to generate a specific sub-set of event identifier values, such that a remote device can deduce implicit information from the event identifier value being received, based upon which sub-set the event identifier relates to.

* * * * *